(12) United States Patent
Saito et al.

(10) Patent No.: US 8,722,801 B2
(45) Date of Patent: May 13, 2014

(54) PROCESS FOR PRODUCING HYDROLYZABLE SILYL GROUP-CONTAINING FLUOROPOLYMER, AND COMPOSITION CONTAINING HYDROLYZABLE SILYL GROUP-CONTAINING FLUOROPOLYMER

(75) Inventors: Shun Saito, Tokyo (JP); Sho Masuda, Tokyo (JP); Hiroshi Nishio, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 13/463,886

(22) Filed: May 4, 2012

(65) Prior Publication Data

US 2012/0220712 A1 Aug. 30, 2012

Related U.S. Application Data

(63) Continuation of application No. PCT/JP2011/050563, filed on Jan. 14, 2011.

(30) Foreign Application Priority Data

Jan. 15, 2010 (JP) ................................. 2010-007229

(51) Int. Cl.
*C08F 8/00* (2006.01)

(52) U.S. Cl.
USPC .......................... 525/102; 525/131; 525/326.2

(58) Field of Classification Search
USPC ....................................... 525/102, 326.2, 131
See application file for complete search history.

(56) References Cited

U.S. PATENT DOCUMENTS

| 4,804,709 | A | * | 2/1989 | Takago et al. ................. 525/102 |
| 4,886,862 | A | * | 12/1989 | Kuwamura et al. ........... 526/247 |
| 5,621,042 | A | * | 4/1997 | Hanada et al. ................. 525/102 |
| 7,977,399 | B2 | * | 7/2011 | Hasegawa ..................... 522/112 |
| 8,344,071 | B2 | * | 1/2013 | Watanabe et al. .......... 525/326.3 |
| 2010/0331482 | A1 | * | 12/2010 | Saito et al. .................... 524/588 |

FOREIGN PATENT DOCUMENTS

| EP | 693533 A1 * | 1/1996 |
| JP | 62-149764 | 7/1987 |
| JP | 63-030571 | 2/1988 |
| JP | 05-301927 | 11/1993 |
| JP | 11-310672 | 11/1999 |
| WO | WO 2008041768 A1 * | 4/2008 |
| WO | WO 2008047761 A1 * | 4/2008 |
| WO | WO 2009/113591 | 9/2009 |
| WO | WO 2010/035782 | 4/2010 |

OTHER PUBLICATIONS

Abstract of JP 04-222877, date unknown.*
International Search Report issued Mar. 8, 2011 in PCT/JP2011/050563 filed Jan. 14, 2011.

* cited by examiner

Primary Examiner — Nicole M Buie-Hatcher
(74) Attorney, Agent, or Firm — Oblon, Spivak, McClelland, Maier & Neustadt, L.L.P.

(57) ABSTRACT

The present invention has an object to provide a process for producing a hydrolyzable silyl group-containing fluoropolymer which is excellent in storage stability and has a sufficient pot life. At the time of producing a hydrolyzable silyl group-containing fluoropolymer by reacting an isocyanate group of an isocyanate group-containing alkoxysilane to a hydroxy group of a hydroxy group-containing fluoropolymer, the reaction is carried out in the presence a compound containing a specific metal atom at a certain concentration.

12 Claims, No Drawings

PROCESS FOR PRODUCING HYDROLYZABLE SILYL GROUP-CONTAINING FLUOROPOLYMER, AND COMPOSITION CONTAINING HYDROLYZABLE SILYL GROUP-CONTAINING FLUOROPOLYMER

This application is a continuation of PCT Application No. PCT/JP2011/050563, filed Jan. 14, 2011, which is based upon and claims the benefit of priority from Japanese Patent Application No. 2010-007229 filed on Jan. 15, 2010. The contents of those applications are incorporated herein by reference in its entirety.

TECHNICAL FIELD

The present invention relates to a process for producing a hydrolyzable silyl group-containing fluoropolymer, and a composition containing a hydrolyzable silyl group-containing fluoropolymer.

BACKGROUND ART

A fluororesin coating material is a coating material having a fluoropolymer incorporated, and since it is excellent in weather resistance and ultraviolet light resistance, it has been used in recent years as a maintenance free high performance coating material in a wide range of applications to e.g. tall buildings, large structures, ships, vehicles, houses, bridges, etc. Especially, a fluoropolymer containing hydrolyzable silyl groups is useful as a fluororesin for an environment-friendly coating material which is less influential over the global environment, since an organosilane type curing agent easy to handle can be used as a curing agent. Further, in a case where a fluoropolymer containing hydrolyzable silyl groups is used as a raw material for a fluororesin coating material, the physical properties of the coating film, such as weather resistance, hardness, water repellency, etc. are improved, and thus, such is useful also from the viewpoint of high functionality of the coating film.

However, the hydrolyzable silyl group-containing fluoropolymer is likely to undergo gelation as the internal crosslinking reaction of hydrolyzable silyl groups is likely to readily proceed by e.g. moisture in air, whereby it has been very difficult to secure a practically sufficient pot life and storage stability.

As a process for producing a hydrolyzable silyl group-containing fluoropolymer, processes have been proposed wherein an alkoxysilane compound having an isocyanate group is reacted to hydroxy groups of a hydroxy group-containing fluoropolymer under such a condition that dibutyltin dilaurate as an organic metal catalyst is present in an amount of from 25 to 35 ppm by mass of tin metal single substance based on the hydroxy group-containing fluoropolymer, or no such an organic metal catalyst is present (Patent Documents 1 to 3). However, in each of such processes, it has been difficult to obtain a hydrolyzable silyl group-containing fluoropolymer which is excellent in storage stability and has a sufficient pot life.

PRIOR ART DOCUMENTS

Patent Documents

Patent Document 1: JP-A-62-149764 (Examples 1 to 4)
Patent Document 2: JP-A-63-30571 (Examples 1 and 2)
Patent Document 3: JP-A-4-222877 (Reference Examples 1 to 3)

DISCLOSURE OF INVENTION

Technical Problem

It is an object of the present invention to provide a process for producing a hydrolyzable silyl group-containing fluoropolymer which is excellent in storage stability and has a sufficient pot life.

Solution to Problem

The present inventors have found that at the time of reacting an isocyanate group of an isocyanate group-containing alkoxysilane compound to a hydroxy group of a hydroxy group-containing fluoropolymer, the type and amount of a compound containing a metal atom to be used as a reaction catalyst, are influential over the storage stability of the obtainable hydrolyzable silyl group-containing fluoropolymer, and have arrived at the present invention.

That is, it has been found that at the time of reacting an isocyanate group of an isocyanate group-containing alkoxysilane to a hydroxy group of a hydroxy group-containing fluoropolymer, by carrying out the reaction under such a condition that a compound containing a specific metal atom is present at a certain concentration, it is possible to produce a hydrolyzable silyl group-containing fluoropolymer which is excellent in storage stability and has a sufficient pot life.

The present invention provides the following [1] to [15].
[1] A process for producing a hydrolyzable silyl group-containing fluoropolymer, which comprises reacting a hydroxy group-containing fluoropolymer (A) and a compound (1) represented by the following formula (1) in the presence of a reaction solvent and a compound (2) represented by the following formula (2) under such a condition that the amount of the compound (2) is from 40 to 140 ppm by mass of metal in the compound (2) based on the hydroxy group-containing polymer (A), to obtain a fluoropolymer (B) having a group represented by the following formula (3):

$$OCN(CH_2)_mSiX^1_nR^1_{3-n} \quad (1)$$

(in the formula (1), $R^1$ is a hydrogen atom or a $C_{1-10}$ monovalent hydrocarbon group, $X^1$ is a $C_{1-5}$ alkoxy group, n is an integer of from 1 to 3, and m is an integer of from 1 to 5), $$MZ_n \quad (2)$$

(in the formula (2), M is a metal atom having an oxidation number of from 2 to 4 and an electronegativity of from 1.3 to 2.5, or an alkyl metal having at least one alkyl group bonded to such a metal atom, Z is at least one atom or group selected from an oxygen atom, an alkoxy group, an aryloxy group and an acyloxy group, and n is a number of Z bonded to M and is an integer of the same value as the oxidation number of M, provided that when n is 2 or more, the plurality of Z may be the same or different, or may be connected to each other to form at least one ring structure, or when, among the plurality of Z, there is Z that does not form a ring structure other than the ones forming the ring structure, such Z is at least one atom or group selected from an oxygen atom, an alkoxy group, an aryloxy group and an acyloxy group), $$-OC(O)NH(CH_2)_mSiX^1_nR^1_{3-n} \quad (3)$$

(in the formula (3), $R^1$, $X^1$, n and m are as defined above).

[2] The process for producing a hydrolyzable silyl group-containing fluoropolymer according to [1], wherein M is at least one metal selected from zinc, tin, lead, aluminum, titanium and zirconium.
[3] The process for producing a hydrolyzable silyl group-containing fluoropolymer according to [1] or [2], wherein the compound (1) represented by the formula (1) is reacted in an amount of from 0.8 to 1.5 times by mol per mol of the hydroxy group in the hydroxy group-containing fluoropolymer (A).
[4] The process for producing a hydrolyzable silyl group-containing fluoropolymer according to any one of [1] to [3] wherein the hydroxy group-containing fluoropolymer (A) is a polymer that comprises repeating units (A1) based on a fluoroolefin and repeating units (A2) based on a hydroxy group-containing monomer and that further contains at least one type of repeating units selected from repeating units (A3) based on a monomer which has an alkyl group and a polymerizable unsaturated group connected by an ether bond or an ester bond, and repeating units (A4) based on an oxetanyl group-containing monomer which may have a substituent.
[5] The process for producing a hydrolyzable silyl group-containing fluoropolymer according to any one of [1] to [4], wherein the reaction solvent is a weak solvent.
[6] A composition comprising the hydrolyzable silyl group-containing fluoropolymer (B) produced by the process as defined in any one of [1] to [5], and the reaction solvent used in the process.
[7] The composition according to [6], which further contains the compound (2) used in the process.
[8] A process for producing a composition comprising a weak solvent and a hydrolyzable silyl group-containing fluoropolymer, which comprises producing a composition comprising a reaction solvent and the hydrolyzable silyl group-containing fluoropolymer (B) by the process as defined in any one of [1] to [4] by using the reaction solvent other than the weak solvent, and then carrying out solvent substitution of the weak solvent for the reaction solvent.
[9] The process for producing a composition according to [8], wherein the composition comprising the weak solvent further contains the compound (2) used for the reaction to produce the hydrolyzable silyl group-containing fluoropolymer (B).
[10] A composition comprising a weak solvent and a hydrolyzable silyl group-containing fluoropolymer (B), produced by the process as defined in [8] or [9].
[11] A process for producing a dehydration agent-containing composition, which comprises adding, to the composition as defined in any one of [6], [7] or [10], at least one dehydration agent selected from the group consisting of ortho acid esters, acetals and hemiacetals, in an amount of from 0.1 to 10.0 parts by mass per 100 parts by mass of the fluoropolymer (B).
[12] A dehydration agent-containing composition comprising the hydrolyzable silyl group-containing fluoropolymer (B) produced by the process as defined in any one of [1] to [5], at least one dehydration agent selected from the group consisting of ortho acid esters, acetals and hemiacetals, and a weak solvent, wherein the content of the dehydration agent is from 0.1 to 10.0 parts by mass per 100 parts by mass of the fluoropolymer (B).
[13] A coating composition comprising the hydrolyzable silyl group-containing fluoropolymer (B) produced by the process as defined in any one of [1] to [5], at least one dehydration agent selected from the group consisting of ortho acid esters, acetals and hemiacetals, a weak solvent, and a coating additive, wherein the content of the dehydration agent is from 0.1 to 10.0 parts by mass per 100 parts by mass of the fluoropolymer (B).

[14] A coating composition comprising the hydrolyzable silyl group-containing fluoropolymer (B) produced by the process as defined in any one of [1] to [5], a weak solvent, and a coating additive.
[15] The coating composition according to [13] or [14], which further contains the compound (2) used for the reaction to produce the hydrolyzable silyl group-containing fluoropolymer (B).

Advantageous Effects of Invention

According to the present invention, it is possible to provide a process for producing a hydrolyzable silyl group-containing fluoropolymer which is excellent in storage stability for an ultralong period that has not been heretofore accomplished and which has a sufficient pot life.

DESCRIPTION OF EMBODIMENTS

Now, the present invention will be described in detail.
In this specification, polymerized units obtainable by polymerization of a monomer may be referred to as "units", and repeating units (A1) based on a fluoroolefin may be referred to as "units (A1) of a fluoroolefin" or simply as "units (A1)". Other polymerized units may be referred to in the same manner.
Further, in this specification, compound (1) represented by the formula (1) may be referred to as "compound (1)", and compound (2) represented by the formula (2) may be referred to as "compound (2)". The term (meth)acrylic acid represents "acrylic acid" or "methacrylic acid". The term (meth)acryloyl represents "acryloyl" or "methacryloyl".
The present invention is characterized in that in the production of a fluorinated polymer having a group represented by the following formula (3) obtainable by reacting an isocyanate group of a compound (1) represented by the following formula (1) to a hydroxy group of a hydroxy group-containing fluoropolymer (A), the reaction is carried out under such a condition that a compound (2) represented by the following formula (2) is present in an amount of from 40 to 140 ppm by mass of a metal in the compound (2):

$$OCN(CH_2)_m SiX^1_n R^1_{3-n} \qquad (1)$$

(in the formula (1), $R^1$ is a hydrogen atom or a $C_{1-10}$ monovalent hydrocarbon group, $X^1$ is a $C_{1-5}$ alkoxy group, n is an integer of from 1 to 3, and m is an integer of from 1 to 5), $$MZ_n \qquad (2)$$

(in the formula (2), M is a metal atom having an oxidation number of from 2 to 4 and an electronegativity of from 1.3 to 2.5, or an alkyl metal having at least one alkyl group bonded to such a metal atom, Z is an oxygen atom, an alkoxy group, a phenoxy group or an acyloxy group, and n is a number of Z bonded to M and is an integer of the same value as the oxidation number of M, provided that when n is 2 or more, the plurality of Z may be the same or different, or may be connected to each other to form at least one ring structure, or when, among the plurality of Z, there is Z that does not form a ring structure, such Z is at least one atom or group selected from an oxygen atom, an alkoxy group, an aryloxy group and an acyloxy group), $$-OC(O)NH(CH_2)_m SiX^1_n R^1_{3-n} \qquad (3)$$

(in the formula (3), $R^1$, $X^1$, n and m are as defined above).
[Hydroxy Group-Containing Fluoropolymer (A)]
The hydroxy group-containing fluoropolymer (A) (hereinafter sometimes referred to as "polymer (A)") is a polymer having fluorine atoms and hydroxy groups. It preferably comprises units (A1) of a fluoroolefin and units (A2) of a hydroxy group-containing monomer. Further, in addition to units (A1) and units (A2), it preferably further contains at least one type of units selected from units (A3) of a monomer which has an alkyl group and a polymerizable unsaturated group connected by an ether bond or an ester bond (hereinafter referred to as "an alkyl group-containing monomer"), and units (A4) of an oxetanyl group-containing monomer which may have a substituent.

[Units (A1) Based on Fluoroolefin]

The units (A1) based on a fluoroolefin are polymerized units formed by polymerization of a fluoroolefin. The fluoroolefin is a compound having one or more hydrogen atoms of an unsaturated hydrocarbon compound substituted by fluorine atoms, and is a polymerizable compound wherein some or all of the rest of hydrogen atoms may be substituted by chlorine atoms.

Among the hydrogen atoms, the number of hydrogen atoms substituted by fluorine atoms (hereinafter referred to as "the fluorine-addition number") is preferably at least 2, more preferably from 3 to 4. When the fluorine-addition number is at least 2, the weather resistance of the coating film will be sufficient.

The fluoroolefin is preferably a $C_{2-3}$ fluoroolefin such as tetrafluoroethylene, chlorotrifluoroethylene, hexafluoropropylene, vinylidene fluoride or vinyl fluoride, and from the viewpoint of the weather resistance and solvent resistance of the coating film, tetrafluoroethylene (hereinafter sometimes referred to as "TFE") or chlorotrifluoroethylene (hereinafter sometimes referred to as "CTFE") is more preferred.

The units (A1) contained in the polymer (A) may be one type only, or two or more types.

[Units (A2) Based on Hydroxy Group-Containing Monomer]

The units (A2) based on a hydroxy group-containing monomer are polymerized units formed by polymerization of a hydroxy group-containing monomer. The hydroxy group-containing monomer may, for example, be preferably a hydroxyalkyl vinyl ether such as hydroxyethyl vinyl ether, hydroxybutyl vinyl ether or cyclohexanedimethanol monovinyl ether; a polyethylene glycol monovinyl ether such as diethylene glycol monovinyl ether, triethylene glycol monovinyl ether or tetraethylene glycol monovinyl ether; a hydroxyalkyl allyl ether such as hydroxyethyl allyl ether, hydroxybutyl allyl ether or cyclohexanedimethanol monoallyl ether; a polyethylene glycol monoallyl ether such as diethylene glycol monoallyl ether, triethylene glycol monoallyl ether or tetraethylene glycol monoallyl ether; a hydroxyalkylcarboxylic acid vinyl ester such as hydroxyacetic acid vinyl ester, 3-hydroxypropionic acid vinyl ester or 4-hydroxybutyric acid vinyl ester; a hydroxyalkylcarboxylic acid allyl ester such as hydroxyacetic acid allyl ester, 3-hydroxypropionic acid allyl ester or 4-hydroxybutyric acid allyl ester; a (meth)acrylic acid hydroxyalkyl ester such as (meth)acrylic acid hydroxymethyl ester, (meth)acrylic acid 2-hydroxyethyl ester, (meth)acrylic acid 3-hydroxypropyl ester, or (meth)acrylic acid 1,4-cyclohexanedimethanol monoester; or a vinylacetic acid hydroxyalkyl ester such as vinyl acetic acid hydroxymethyl ester, a vinyl acetic acid 2-hydroxyethyl ester, vinyl acetic acid 3-hydroxypropyl ester or vinyl acetic acid 1,4-cyclohexanedimethanol monoester.

In a case where the hydroxy group-containing monomer is a polyethylene glycol monovinyl ether or a polyethylene glycol monoallyl ether, the number for "poly" is preferably from 2 to 20, more preferably from 2 to 15, further preferably from 2 to 10.

As the hydroxy group-containing monomer, a hydroxyalkyl vinyl ether or a polyethylene glycol monovinyl ether is more preferred, since it is excellent in alternating copolymerizability and has a high reactivity with the compound (1). Specifically, hydroxyethyl vinyl ether, hydroxybutyl vinyl ether or diethylene glycol monovinyl ether is more preferred.

The units (A2) contained in the polymer (A) may be one type alone, or two or more types.

[Units (A3) Based on Alkyl Group-Containing Monomer]

The units (A3) based on an alkyl group-containing monomer are polymerized units formed by polymerization of an alkyl group-containing monomer. The alkyl group-containing monomer is a monomer wherein an alkyl group and a polymerizable unsaturated group are connected by an ether bond or an ester bond (hereinafter, such an ether bond and ester bond are generally referred to as "a connecting bond"). In a case where the connecting bond is an ester group, the polymerizable unsaturated group is preferably bonded to an oxygen atom of the ester bond.

The polymerizable unsaturated group is preferably an ethylenic unsaturated group such as a vinyl group, an allyl group or a 1-propenyl group. Further, the connecting bond to such a polymerizable unsaturated group preferably takes a structure of vinyl ether, allyl ether, vinyl ester or allyl ester.

The alkyl group has preferably from 2 to 16 carbon atoms, more preferably from 2 to 10 carbon atoms. As the structure of the alkyl group, a linear alkyl group or a branched alkyl group is preferred, or it may have a cyclic structure. As such a cyclic structure, a cyclopentyl group or a cyclohexyl group is, for example, preferred. As the structure of the alkyl group, a branched alkyl group is more preferred, and a $C_{3-10}$ branched alkyl group is particularly preferred, since the solubility of the polymer (A) in a solvent is good when the after-described weak solvent is used as the solvent.

The monomer to form units (A3) by polymerization may, for example, be preferably a vinyl ether such as ethyl vinyl ether, butyl vinyl ether, 2-ethylhexyl vinyl ether or cyclohexyl vinyl ether; an allyl ether such as ethyl allyl ether, butyl allyl ether or cyclohexyl allyl ether; a vinyl ester such as vinyl acetate, vinyl pivalate, vinyl benzoate or vinyl versatate; or an allyl ester such as allyl acetate, allyl pivalate, allyl benzoate or allyl versatate. The monomer to form units (A3) is particularly preferably ethyl vinyl ether, 2-ethylhexyl vinyl ether or vinyl versatate, since the solubility of the hydroxy group-containing fluoropolymer (A) in a solvent is thereby improved when the after-described weak solvent is used as the solvent.

The units (A3) to be contained in the polymer (A) may be one type only, or two or more types.

[Units (A4) Based on Oxetanyl Group-Containing Monomer]

The units (A4) based on an oxetanyl group-containing monomer are polymerized units formed by polymerization of a monomer containing an oxetanyl group. The oxetanyl group in the oxetanyl group-containing monomer may have a substituent on the oxetane ring. The oxetanyl group-containing monomer may, for example, be a vinyl ether containing an oxetanyl group, an allyl ether containing an oxetanyl group, an isopropenyl ether containing an oxetanyl group, a (meth)acrylic acid ester containing an oxetanyl group, or a monomer having a substituent on the oxetane ring of an oxetanyl group of such a monomer.

Specifically, 3-ethyl-3-vinyloxymethyloxetane, 3-ethyl-3-(4-vinyloxycyclohexyloxymethyl) oxetane, 3-ethyl-3-allyloxymethyloxetane, 3-methacryloxymethyl-3-ethyloxetane or 3-acryloyloxymethyl-3-ethyloxetane is, for example, preferred. From the viewpoint of the availability and the alternating copolymerizability with a fluoroolefin, 3-ethyl-3-hydroxymethyloxetane is more preferred.

The units (A4) contained in the polymer (A) may be one type only, or two or more types.

[Other Units]

The polymer (A) may further contain units other than the above (A1) to (A4) (hereinafter referred to as "other units").

As a monomer to form other units, a crosslinkable monomer is preferred in order to improve the toughness, solvent resistance, etc. of a coating film in use as a coating material.

Specifically, it may preferably be a carboxy group-containing monomer such as (meth)acrylic acid, itaconic acid, fumaric acid, maleic acid, citraconic acid or undecylenic acid; a carboxylic anhydride group-containing monomer such as maleic anhydride; or an epoxy group-containing monomer such as glycidyl vinyl ether, glycidyl vinyl ester, glycidyl allyl ether or glycidyl(meth)acrylate.

In a case where other units are contained in the polymer (A), the proportion of other units based on all polymerized units in the polymer (A) is preferably from 0 to 5 mol %. The proportion of other units being 0 mol % means that no other units are contained. In a case where other units are contained, the lower limit is more than 0 mol %, preferably 0.01 mol %.

Other units contained in the polymer (A) may be one type only, or two or more types.

[Contents of Units (A1), Units (A2) and Units (A3) or Units (A4) in Hydroxy Group-Containing Fluoropolymer (A)]

The proportion of units (A1) in the polymer (A) is preferably from 10 to 90 mol %, more preferably from 20 to 80 mol %, based on all polymerized units in the polymer (A). When the proportion of units (A1) is at least 10 mol %, the weather resistance of the coating film will be sufficient. When it is at most 90 mol %, the solubility in a solvent will be sufficient.

The proportion of units (A2) in the polymer (A) is preferably from 1 to 70 mol %, more preferably from 5 to 50 mol %, based on all polymerized units in the polymer (A). When the proportion of units (A2) is at least 1 mol %, the compatibility between the polymer (A) and the compound (1) will be sufficient. When it is at most 70 mol %, it is possible to reduce contamination by deposition of a condensate of the compound (1) on the inner wall at the gas-liquid interface in the reactor after the reaction of hydroxy groups in the polymer (A) with the compound (1).

The proportions of units (A3) and units (A4) in the polymer (A) are, respectively, preferably from 5 to 70 mol %, more preferably from 10 to 50 mol %, based on all polymerized units in the polymer (A). When the proportion of units (A3) is at least 5 mol %, the solubility in the solvent will be sufficient. When it is at most 70 mol %, the flexibility, chipping resistance, bending processability and adhesion to the substrate, of the coating film, will be sufficient. When the proportion of units (A4) is within such a range, the hardness of the coating film will be sufficient when photocured.

[Composition of Hydroxy Group-Containing Fluoropolymer (A)]

The polymer (A) preferably contains units (A1) and units (A2) as essential units. Further, the polymer (A) preferably contains at least one type of units selected from units (A3) and units (A4), and is further preferably a polymer which optionally contains other units.

A preferred combination of units for the polymer (A) may, for example, be a polymer of units of CTFE/units of a hydroxyalkyl vinyl ether/units of an alkyl vinyl ether, a polymer of units of CTFE/units of a hydroxyalkyl vinyl ether/units of an alkyl vinyl ester, a polymer of units of TFE/units of a hydroxyalkyl vinyl ether/units of an alkyl vinyl ether, a polymer of units of TFE/units of a hydroxyalkyl vinyl ether/units of an alkyl vinyl ester, or a polymer of units of CTFE/units of a hydroxyalkyl vinyl ether/units of a vinyloxyalkyloxetane. Further, a combination having other units incorporated to such a preferred combination, is also preferred.

[Fluorine Content in Hydroxy Group-Containing Fluoropolymer (A)]

The fluorine content in the polymer (A) is preferably at least 10 mass %, more preferably at least 20 mass %, further preferably at least 25 mass %. The higher the fluorine content, the better the weather resistance of a coating film.

On the other hand, the fluorine content in the hydroxy group-containing fluoropolymer (A) is preferably at most 35 mass %. When the fluorine content is within this range, the solubility of the hydroxy group-containing fluoropolymer (A) in a solvent can sufficiently be secured.

[Polymerization Method for Hydroxy Group-Containing Fluoropolymer (A)]

The polymerization method for the polymer (A) may be carried out by a known method. For example, a usual radical polymerization method may be employed, and as such a polymerization method, solution polymerization, suspension polymerization or emulsion polymerization may, for example, be employed.

The polymerization reaction for the polymer (A) is preferably solution polymerization using an organic solvent, since the reaction can thereby be easily carried out in a uniform reaction system. The organic solvent to be used for the polymerization reaction may, for example, be preferably an organic hydrocarbon such as benzene, toluene, xylene, ethylbenzene, aromatic petroleum naphtha, tetraline, turpentine oil, SOLVESSO #100 (registered trademark of Exxon) or SOLVESSO #150 (registered trademark of Exxon); an alcohol such as ethanol, butanol or propanol; an ether such as dioxane, tetrahydrofuran or cyclopentyl methyl ether; an ester or ether ester, such as methyl acetate, ethyl acetate, n-propyl acetate, isopropyl acetate, n-butyl acetate, isobutyl acetate, secondary butyl acetate, amyl acetate, propylene glycol monomethyl ether or methoxybutyl acetate; a ketone such as acetone, methyl ethyl ketone, diisobutyl ketone, diethyl ketone, methyl propyl ketone, diisopropyl ketone, methyl amylohexanone, isophorone, mesityl oxide, methyl isoamyl ketone, ethyl n-butyl ketone or ethyl amyl ketone; an aprotic polar solvent such as dimethylsulfoxide or N,N-dimethylformamide; or a glycol derivative such as triethylene glycol monomethyl ether, diethylene glycol monomethyl ether, diethylene glycol monobutyl ether, diethylene glycol monohexyl ether, propylene glycol monomethyl ether acetate, ethylene glycol monophenyl ether, diethylene glycol monophenyl ether, dipropylene glycol, diethylene glycol-2-ethylhexyl ether or tetraethylene glycol dimethyl ether.

One type of the above organic solvents may be used alone, or two or more types may be used in combination. The amount of the organic solvent is not particularly limited, but it is usually from 5 to 95 parts by weight, more preferably from 20 to 80 parts by weight, per 100 parts by weight of the monomer material.

The reaction temperature for the polymerization may suitably be changed depending upon the polymerization initiator. In the case of radical polymerization, it is usually preferably from 0 to 130° C. The reaction time is usually preferably from about 1 to 50 hours.

The polymerization initiator for solution polymerization may, for example, be preferably a ketone peroxide such as methyl ethyl ketone peroxide, cyclohexanone peroxide, 3,3, 5-trimethylcyclohexanone peroxide, methylcyclohexanone peroxide, methylacetoacetate peroxide or acetylacetone peroxide; a peroxy ketal such as 1,1-bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy) valerate or 2,2-bis(t-butylperoxy)butane; a hydroperoxide such as t-butyl hydroperoxide, cumene hydroperoxide, diisopropylbenzene peroxide, p-menthane hydroperoxide, 2,5-dimethylhexane-2,5-dihydroperoxide or 1,1,3,3-tetramethylbutyl hydroperoxide; a dialkyl peroxide such as di-t-butyl peroxide, t-butylcumyl peroxide, dicumyl peroxide, α-α'-bis(t-butylperoxy-m-isopropyl)benzene, 2,5-dimethyl-2,5-di(t-butylperoxy)hexane or 2,5-dimethyl-2,5-di(t-butylperoxy)hexyne; a diacyl peroxide such as acetyl peroxide, isobutyl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide or m-toluyl peroxide; a peroxy dicarbonate such as diisopropylperoxy dicarbonate, di-2-ethylhexylperoxy dicarbonate, di-n-propylperoxy dicarbonate, bis-(4-t-butylcyclohexyl)peroxy dicarbonate, di-myristylperoxy dicarbonate, di-2-ethoxyethylperoxy dicarbonate, dimethoxyisopropylperoxy dicarbonate, di-(3-methyl-3-methoxybutyl)peroxy dicarbonate or diallylperoxy dicarbonate; a peroxyester such as t-butylperoxyacetate, t-butylperoxyisobutyrate, t-butylperoxypivalate, t-butylperoxyneodecanoate, cumylperoxyneodecanoate, t-butylperoxy-2-ethylhexanoate, t-butylperoxy-3,5,5-trimethylhexanoate, t-butylperoxylaurate, t-butylperoxybenzoate, di-t-butylperoxyisophthalate, 2,5-dimethyl-2,5-di(benzoylperoxy)hexane, t-butylperoxymaleate, cumylperoxyneodecanoate, t-hexylperoxypivalate, t-butylperoxyneodecanoate, t-hexylperoxyneodecanoate, cumylperoxyneohexanoate, acetylcyclohexylsulfonyl peroxide or 3,3',4,4'-tetra(t-butylperoxycarbonyl)benzophenone; a peroxycarbonate ester such as t-butylperoxyisopropyl carbonate, t-butylperoxyallyl carbonate, t-hexylperoxy-n-butylcarbonate or t-butylperoxy-n-propylcarbonate; or an azo compound such as 2,2'-azobis(4-methoxy-2,4-dimethylvaleronitrile), 2,2'-azobis(2,4-dimethylvaleronitrile), 2,2'-azobis(2-methylpropionitrile), 2,2'-azobis(2-methylbutyronitrile), 1,1'-azobis(cyclohexane-1-carbonitrile), 2-(carbamoylazo) isobutyronitrile, 2,2'-azobis {2-methyl-N-[1,1-bis(hydroxymethyl)-2-hydroxyethyl]propionamide}, 2,2'-azobis[2-methyl-N-[2-(1-hydroxybutyl)]-propionamide], 2,2'-azobis[2-methyl-N-(2-hydroxyethyl)-propionamide], 2,2'-azobis[N-(2-propenyl)-2-methylpropionamide], 2,2'-azobis(N-butyl-2-methylpriopionamide), 2,2'-azobis(N-cyclohexyl-2-methylpropionamide), 2,2'-azobis[2-(5-methyl-2-imidazolin-2-yl)propane]dihydrochloride, 2,2'-azobis[2-(2-imidazolin-2-yl)propane]disulfate dehydrate, 2,2'-azobis[2-(3,4,5,6-tetrahydropyridin-2-yl) propane]dihydrochloride, 2,2'-azobis{2-[1-(2-hydroxyethyl)-2-imidazolin-2-yl]propane}dihydrochloride, 2,2'-azobis[2-(2-imidazolin-2-yl)propane, 2,2'-azobis(2-methylpropionamidine) dihydrochloride, 2,2'-azobis[N-(2-carboxyethyl)-2-methylpropionamidine], 2,2'-azobis(2-methylpropionamidoxime), dimethyl-2,2'-azobis(2-methylpropionate), 4,4'-azobis(4-cyanovaleric acid) or 2,2'-azobis(2,4,4-trimethylpentane).

One type of these polymerization initiators may be used alone, or two or more types may be used in combination.

In a case where the polymerization reaction for the polymer (A) is carried out by emulsion polymerization, it is preferred to carry out the polymerization reaction in water in the presence of an anionic or nonionic emulsifier by using an initiator such as a water-soluble peroxide, a persulfate or a water-soluble azo compound.

In the polymerization reaction, a very small amount of hydrochloric acid or hydrofluoric acid may be formed, and in such a case, it is preferred to remove such hydrochloric acid or hydrofluoric acid by a buffer such as calcium carbonate or potassium carbonate, after the polymerization reaction.

The molecular weight of the polymer (A) is preferably from 5,000 to 20,000 by number average molecular weight (Mn) as measured by gel permeation chromatography (GPC) using polystyrene as the standard substance. When Mn is at least 5,000, the weather resistance of a coating film will be good, and when Mn is at most 20,000, gelation is less likely to take place at the time of the reaction with the compound (1).

As the polymer (A), a commercially available fluororesin such as LUMIFLON (tradename, manufactured by Asahi Glass Company, Limited), FLUONATE (tradename, manufactured by DIC Corporation), CEFRAL COAT (tradename, manufactured by Central Glass Co., Ltd.), ZAFLON (tradename, manufactured by TOAGOSEI Co., Ltd.) or ZEFFLE (tradename, manufactured by Daikin Industries, Ltd.) may be used.

[Compound (1) Represented by Formula (1)]

In the process of the present invention, a compound (1) represented by the following formula (1) is used.

$$OCN(CH_2)_m SiX^1_n R^1_{3-n} \qquad (1)$$

In the compound (1) represented by the formula (1), $R^1$ is a hydrogen atom or a $C_{1-10}$ monovalent hydrocarbon group, wherein the number of carbon atoms is preferably from 1 to 5, more preferably 1 or 2. Specifically, a methyl group or an ethyl group is preferred. $X^1$ is a $C_{1-5}$ alkoxy group, and an ethoxy group or a methoxy group is preferred. n is an integer of from 1 to 3, preferably 3, and m is an integer of from 1 to 5, preferably from 2 to 4.

Specifically, the compound (1) may, for example, be preferably 3-isocyanate propyl trimethoxysilane, 3-isocyanate propyl triethoxysilane, 3-isocyanate propyl methyldimethoxysilane, 3-isocyanate propyl methyldiethoxysilane, 3-isocyanate propyl dimethylmethoxysilane, 3-isocyanate propyl dimethylethoxysilane, 4-isocyanate butyl trimethoxysilane, 4-isocyanate butyl triethoxysilane, 2-isocyanate ethyl trimethoxysilane or 2-isocyanate ethyl triethoxysilane.

Among them, 3-isocyanate propyl trimethoxysilane or 3-isocyanate propyl triethoxysilane is more preferred, since it is readily available.

As the compound (1), one type may be used alone, or two or more types may be used in combination.

[Compound (2) Containing Metal Atom]

The compound (2) containing a metal atom to be used in the process of the present invention has a structure represented by the following formula (2).

$$MZ_n \qquad (2)$$

In the compound (2) represented by the formula (2), M is a metal atom having an oxidation number of from 2 to 4 and an electronegativity of from 1.3 to 2.5, or an alkyl metal having at least one alkyl group bonded to such a metal atom.

In the compound (2), from the viewpoint of the availability, in a case where M in the compound (2) is a metal atom, M is preferably at least one metal atom selected from zinc (oxidation number: 2, electronegativity: 1.65), tin (oxidation number: 2 or 4, electronegativity: 1.96), lead (oxidation number: 2 or 4, electronegativity: 2.33), aluminum (oxidation number: 3, electronegativity: 1.61), titanium (oxidation number: 4, electronegativity: 1.54) and zirconium (oxidation number: 4, electronegativity: 1.33). Further, M is more preferably an amphoteric metal, and specifically, zinc, tin or aluminum is preferred.

Otherwise, M may be an alkyl metal having at least one alkyl group bonded to the above metal atom. Tin is preferred as the metal atom in the case of such an alkyl metal. As such an alkyl group, a $C_{1-6}$ alkyl group is preferred. The number of alkyl groups bonded to one metal atom is preferably from 1 to 4, more preferably 2 or 3.

Z is at least one atom or group selected from an oxygen atom, an alkoxy group, an aryloxy group and an acyloxy group, and n is a number of Z bonded to M and is an integer of the same value as the oxidation number of M. However, when n is 2 or more, the plurality of Z may be the same or different, or may be connected to each other to form at least one ring structure, or when, among the plurality of Z, there is Z that does not form a ring structure other than the ones forming the ring structure, such Z is at least one atom or group selected from an oxygen atom, an alkoxy group, an aryloxy group and an acyloxy group.

The compound (2) acts as a catalyst in the reaction of the hydroxy group and the isocyanate group, to accelerate the reaction. In order to improve the storage stability of the hydrolyzable silyl group-containing fluoropolymer obtainable by the process of the present invention, the compound to be used as a catalyst is preferably not influential over the reaction of silanol groups to one another, or silanol groups and other groups, although it accelerates the reaction of the hydroxy group and the isocyanate group.

It is considered that in the compound (2) comprising a specific ligand and a metal atom having an oxidation number of from 2 to 4 and an electronegativity within a range of from 1.3 to 2.5, the electron density on the metal atom and the coordination angle of the ligand are optimized to accelerate the reaction of the hydroxy group and the isocyanate group, but not to be influential over the reaction of silanol groups to each other, or silanol groups and other groups.

Specifically, the compound (2) may, for example, be preferably a metal oxide such as zinc oxide, zirconium oxide, lead oxide, titanium oxide, tin oxide or aluminum oxide; a metal alkoxide such as zinc propoxide, zinc butoxide, zirconium propoxide, zirconium butoxide, lead butoxide, titanium propoxide, titanium butoxide, tin propoxide, aluminum propoxide, tin butoxide or aluminum butoxide; a metal phenoxide such as zinc phenoxide, zirconium phenoxide, lead phenoxide, titanium phenoxide, tin phenoxide or aluminum phenoxide; or a metal salt of a carboxylic acid, such as zinc oxalate, zinc acetate, zinc 2-ethylhexanoate, zirconium acetate, zirconium 2-ethylhexanoate, lead 2-ethylhexanoate, zirconium oxide 2-ethylhexanoate, titanium acetate, titanium 2-ethylhexanoate, titanium oxide 2-ethylhexanoate, tin 2-ethylhexanoate, aluminum 2-ethylhexanoate, tin acetate, aluminum acetate, dibutyltin dilaurate, tributyltin dilaurate, dibutyltin diacetylacetonate or aluminum acetylacetonate.

Among them, a metal salt of a carboxylic acid is preferred, since the catalyst activity is good. Further, among them, tin 2-ethylhexanoate, dibutyltin dilaurate or tributyltin dilaurate is more preferred, since it is readily available. Further, as the compound (2) to be present at the time of the reaction, one type may be used alone, or two or more types may be used in combination.

The above compound (2) to be used in the process of the present invention is within a range of from 40 to 140 ppm by mass of the metal in the compound (2), based on the hydroxy group-containing fluoropolymer (A). The lower limit value of the amount of the compound (2) to be used is preferably 45 ppm, more preferably 50 ppm, most preferably 60 ppm. On the other hand, the upper limit is preferably 110 ppm, more preferably 90 ppm, most preferably 80 ppm.

In the process of the present invention, the compound (2) has a function to accelerate the reaction as a reaction catalyst, but if the compound (2) to be used is too little, it will not sufficiently function as a catalyst, and the reaction may be slow, or an unreacted hydroxy group-containing fluoropolymer (A) or the compound (1) may remain. However, when it is at least 40 ppm, the reaction of the hydroxy group-containing fluoropolymer (A) and the compound (1) will sufficiently proceed, and the hydroxy group-containing fluoropolymer (A) and the compound (1) remaining unreacted will be little or none.

On the other hand, if the content of the compound (2) in a varnish is large, the storage stability of the varnish deteriorates. However, when the amount of the compound (2) present, is at most the amount corresponding to the above-mentioned 140 ppm, there will be no deterioration of the storage stability by coloration or gelation of the varnish containing the obtainable polymer, by the influence of the remaining compound (2). Further, there will be no deposition of the self-condensate of the compound (1) on the inner wall at the gas-liquid interface of the reactor. The remaining compound (2) is considered to cause gelation by accelerating e.g. condensation of hydrolyzable silyl groups to one another or condensation thereof with remaining hydroxy groups.

The amount of the compound (2) to be used in the process of the present invention is by mass of the metal in the compound (2) based on the hydroxy group-containing fluoropolymer (A). The amount of the formed hydrolyzable silyl group-containing fluoropolymer (B) corresponds to the total amount (a+c) of the amount (a) of the hydroxy group-containing fluoropolymer (A) and the amount (c) of the reacted compound (1) (in a case where there is no unreacted substance), and accordingly, the amount of the compound (2) based on the formed hydrolyzable silyl group-containing fluoropolymer corresponds to (a/(a+c)) times the above numerical value by mass of the metal. In reality, it varies depending upon the type of the hydroxy group-containing fluoropolymer (A), the type of the compound (2), the reaction ratio of the two, etc., but the amount corresponding to the above-mentioned numerical value of 140 ppm is roughly at most 135 ppm. Thus, the amount of the compound (2) in the reaction mixture formed in the process of the present invention is considered to be roughly at most 130 ppm, usually at most 125 ppm, by mass of the metal in the compound (2). Further, after formation of the hydrolyzable silyl group-containing fluoropolymer (B), the presence of the compound (2) is not required, and therefore, the amount of the compound (2) in e.g. a varnish may be 0.

Here, the varnish is a solution or dispersion having a synthetic resin, etc. dissolved or dispersed in an organic solvent. In the present invention, it represents a solution or dispersion having the hydrolyzable silyl group-containing fluoropolymer dissolved or dispersed in an organic solvent, and such a solution or dispersion may further contain components other than the hydrolyzable silyl group-containing fluoropolymer and the organic solvent.

Further, when the amount of the compound (2) present during the reaction is within such a range, the compound (2) has a sufficient catalytic action, and the storage stability of the varnish can sufficiently be secured. Therefore, even without removing the compound (2) after the reaction, it is possible to obtain a varnish having a sufficient storage stability. When the amount of the compound (2) in the varnish is within such a range, it is possible to secure a storage stability over an ultralong period of 12 months, which has not been heretofore attained.

In the reaction of the hydroxy group-containing fluoropolymer (A) and the compound (1), it is preferred to react the compound (1) in a proportion of from 0.8 to 1.5 times by mole, per mole of the hydroxy group in the hydroxy group-containing fluoropolymer (A). The lower limit of the proportion of the compound (1) is preferably 0.9 time by mole, more preferably 1.0 time by mole. On the other hand, the upper limit of the proportion of the compound (1) is preferably 1.4 times by mole, more preferably 1.3 times by mole.

When the compound (1) is more than 0.8 time by mole, if the obtained polymer is formed into a coating composition, the stability will be good. When it is at most 1.5 times by mole, even if the compound (1) remains as an unreacted substance, the influence over the stability when the obtained polymer is formed into a coating composition is little, or there will be little influence by inclusion of the self-condensate of the compound (1) as a contaminant.

In the reaction of the hydroxy group-containing fluoropolymer (A) and the compound (1), it is preferred to complete the reaction of the hydroxy group and the isocyanate group. If the compound (1) remains in a large amount, the self-condensate of the compound (1) will be included as a contaminant in the product, or if the obtained hydrolyzable silyl group-containing fluoropolymer (B) has a large amount of hydroxy groups, the storage stability of the coating composition tends to deteriorate, and further, the pot life tends to be short.

The content of units having hydroxy groups in the hydrolyzable silyl group-containing fluoropolymer (B) is preferably from 0 to 3 mol %, more preferably from 0 to 1 mol %, based on all units in the polymer.

The reaction solvent in the reaction of the hydroxy group-containing fluoropolymer (A) and the compound (1), is preferably a solvent containing no active hydrogen reactive with an isocyanate group. As the solvent having no active hydrogen, an organic solvent which is commonly used, may be used, for example, a ketone such as acetone, methyl ethyl ketone, methyl propyl ketone, ethyl butyl ketone, diisobutyl ketone, cyclohexanone or isophorone; an ester such as methyl acetate, ethyl acetate, n-propyl acetate, isopropyl acetate, n-butyl acetate, isobutyl acetate or t-butyl acetate; an aromatic hydrocarbon such as toluene, xylene, ethylbenzene, aromatic petroleum naphtha, tetraline, turpentine oil, SOLVESSO #100 (registered trademark of EXXON) or SOLVESSO #150 (registered trademark of EXXON); an ether such as dioxane, tetrahydrofuran or cyclopentyl methyl ether; an ether ester such as propylene glycol monomethyl ether acetate or methoxybutyl acetate; or an aprotic polar solvent such as dimethylsulfoxide or N,N-dimethylformamide.

As the reaction solvent, a solvent satisfying PRTR Law and HAPs Regulations, i.e. an organic solvent containing no aromatic substance, is preferred with a view to reducing environmental loads. Further, a weak solvent is also preferred. The weak solvent is an organic solvent classified into the third class organic solvent in the classification of organic solvents by Industrial Safety and Health Act and is one corresponding to any one of the following (1) to (2).

(1) Gasoline, coal tar naphtha (including solvent naphtha), petroleum ether, petroleum naphtha, petroleum benzine, turpentine oil, mineral spirit (including mineral thinner, petroleum spirit, white spirit and mineral turpentine)

(2) A mixture of two or more types in (1)

Specifically, it is preferred to use an ester type solvent or a ketone type solvent not falling under PRTR Law or HAPs Regulations, or a paraffin type solvent or a naphthene type solvent classified into the third class organic solvent. In the case of using a paraffin type solvent or a naphthene type solvent, a commercially available weak solvent may be employed.

As the ketone type solvent or the ester type solvent, from the viewpoint of the boiling point of the solubility of the resin, a ketone such as methyl ethyl ketone, diisobutyl ketone, cyclohexanone or isophorone; or an ester such as methyl acetate, ethyl acetate, n-propyl acetate, isopropyl acetate, n-butyl acetate, isobutyl acetate or t-butyl acetate is preferably used, but t-butyl acetate is more preferred which does not belong to the second class organic solvent in the classification of organic solvents by Industrial Safety and Health Act.

As the weak solvent, it is preferred to employ a solvent which belongs to the above (1) or (2). Further, a solvent having an aniline point of from 30° C. to 70° C. is preferred. The lower limit of the aniline point is further preferably 40° C., and the upper limit of the aniline point is further preferably 60° C. When the aniline point exceeds 30° C., the solvent does not affect an old coating film, and when the aniline point is at most 70° C., the fluorocopolymer and the polyisocyanate compound to be used in the present invention become soluble. Here, the aniline point may be measured in accordance with the aniline point test method disclosed in JIS K2256.

As the weak solvent, a mineral spirit is preferred since the flash point is at least room temperature. A solvent which is commercially available as a mineral spirit may, for example, be HAWS (manufactured by Shell Japan, aniline point: 17° C.), ExxonNaphtha No. 6 (manufactured by Exxon Mobil, aniline point: 43° C.), LAWS (manufactured by Shell Japan, aniline point: 44° C.), PEGASOL 3040 (manufactured by Exxon Mobil, aniline point: 55° C.), A Solvent (manufactured by Nippon Petrochemicals Co., Ltd., aniline point: 45° C.), CLENSOL (manufactured by Nippon Petrochemicals Co., Ltd., aniline point: 64° C.), Mineral Spirit A (manufactured by Nippon Petrochemicals Co., Ltd., aniline point: 43° C.), HIGHALOM 2S (manufactured by Nippon Petrochemicals Co., Ltd., aniline point: 44° C.), HIGHALOM 2S (manufactured by Nippon Petrochemicals Co., Ltd., aniline point: 44° C.), LINEALENE 10, LINEALENE 12 (manufactured by Idemitsu Sekiyu, α-olefin type hydrocarbon, aniline point: 44° C., 54° C.), Exxole D30 (Exxon Mobil Corporation, naphthene type solvent, annealing point: 63° C.), Rikasolve 900, 910B, 1000 (manufactured by New Japan Chemical Co., Ltd., hydrogenated C9 solvent, aniline point: 53° C., 40° C., 55° C.) or the like. As the weak solvent to be used in the present invention, they may be used alone or in combination as a mixture.

The reaction of the hydroxy group-containing fluoropolymer (A) and the compound (1) is usually carried out at a temperature of from 40 to 100° C., preferably from 50 to 80° C., in an inert atmosphere of e.g. nitrogen. The reaction pressure is preferably atmospheric pressure. The reaction time is preferably from 4 to 10 hours, particularly preferably from 4 to 7 hours. The reaction solvent is preferably used in an amount of from 10 to 90 wt % based on the hydroxy group-containing fluoropolymer.

When the reaction temperature is at least 40° C., the reaction will be completed, and when it is at most 100° C., there will be no gelation of the reaction liquid during the reaction. Further, when the reaction time is at least 4 hours, the reaction will be completed, and when it is at most 10 hours, there will be no gelation of the reaction liquid during the reaction.

In the process of the present invention, firstly, a composition comprising the hydrolyzable silyl group-containing fluoropolymer (B), the reaction solvent and the compound (2) will be obtained. There may be a case where this composition contains an unreacted hydroxy group-containing fluoropolymer (A) or compound (1), but usually the amount thereof is a negligible amount as compared with the amount of the hydrolyzable silyl group-containing fluoropolymer (B). The obtained composition may be used, as it is, as a varnish. That is, it may be used as a varnish wherein the reaction solvent is an organic solvent. Otherwise, the hydrolyzable silyl group-containing fluoropolymer (B) may be separated, and an organic solvent may be added afresh to the separated hydrolyzable silyl group-containing fluoropolymer (B) to obtain a varnish. The compound (2) may be present in the varnish as mentioned above, and accordingly, it may remain in the separated hydrolyzable silyl group-containing fluoropolymer (B).

As the organic solvent in the varnish, a weak solvent is preferred. By using a weak solvent as the reaction solvent, the composition comprising the hydrolyzable silyl group-containing fluoropolymer (B), the reaction solvent and the compound (2) obtained by the process of the present invention may be used, as it is, as a varnish containing a weak solvent. In a case where a solvent other than a weak solvent is used as the reaction solvent, the hydrolyzable silyl group-containing fluoropolymer (B) only, or the hydrolyzable silyl group-containing fluoropolymer (B) containing the compound (2) may be separated from the composition obtained by the process of the present invention, and a weak solvent is added afresh to obtain a varnish containing the weak solvent. Or, in a case where a weak solvent having a boiling point higher than the reaction solvent is used, a method may be used wherein without separating the hydrolyzable silyl group-containing fluoropolymer (B), the weak solvent is added to the mixture obtained by the production, and then, the reaction solvent is removed by evaporation.

Thus, even in a case where a solvent other than a weak solvent is used as the reaction solvent, it is possible to obtain a varnish containing a weak solvent by the above-mentioned solvent substitution method. That is, by using a reaction solvent other than a weak solvent, a composition comprising the reaction solvent and the hydrolyzable silyl group-containing fluoropolymer (B) is produced, and then, the above reaction solvent is substituted by a weak solvent, whereby it is possible to obtain a varnish comprising the weak solvent and the hydrolyzable silyl group-containing fluoropolymer. In such a solvent substitution method, the compound (2) may be removed or may remain.

Further, a varnish containing an organic solvent other than a weak solvent may be produced by e.g. a solvent substitution method in the same manner as in the case of the above-described weak solvent. After the formation of the hydrolyzable silyl group-containing fluoropolymer (B), at least as a part of the organic solvent in a varnish, it is possible to use an organic solvent other than a solvent which does not contain active hydrogen reactive with the above isocyanate group. For example, it is possible to use an alcohol type solvent.

To the hydrolyzable silyl group-containing fluoropolymer (B) obtainable by the process of the present invention, it is preferred to add a dehydration agent after the reaction, in order to improve the storage stability and pot life of the polymer. Particularly, it is preferred to add a dehydration agent to a varnish containing the hydrolyzable silyl group-containing fluoropolymer (B) and an organic solvent. It is also possible to add, together with the dehydration agent, an organic solvent which cannot be used as the reaction solvent, such as an alcohol type solvent.

The dehydration agent may be added to the composition comprising the hydrolyzable silyl group-containing fluoropolymer (B), the reaction solvent and the compound (2), firstly obtainable in the above-described process of the present invention. Otherwise, it may be added to a varnish obtained by e.g. the above-mentioned solvent substitution. The varnish containing the dehydration agent can be stored for a long period of time.

The dehydration agent is preferably an ortho acid ester, acetal or hemiacetal, represented by the following formula (3):

$$(R^2O)(R^3O)C(R^4)(Y) \quad (3)$$

$R^2$ in the formula (3) is a $C_{1-5}$ linear or branched alkyl group. Each of $R^3$ and $R^4$ is a hydrogen atom or a $C_{1-5}$ linear or branched alkyl group. Y is a hydrogen atom or a $C_{1-5}$ alkoxy group.

The boiling point of the dehydration agent is preferably at most 150° C., more preferably from 5 to 100° C. When the boiling point of the dehydration agent is within this range, the dehydration agent is less likely to remain in the coating film at the time of drying and curing the coating film, and it is possible to form the coating film in a short time.

Specific examples of the ortho acid ester may preferably be an orthoformic acid ester such as trimethyl orthoformate, triethyl orthoformate, or tripropyl orthoformate; an orthoacetic acid ester such as trimethyl orthoacetate, triethyl orthoacetate or tripropyl orthoacetate; and an orthopropionic acid ester such as trimethyl orthopropionate, triethyl orthopropionate or tripropyl orthopropionate.

As the acetal, any one of a compound derived from a ketone compound and a compound derived from an aldehyde compound is preferred, but a compound derived from an aldehyde is more preferred, since the dehydration effect tends to be thereby high. Specific examples of the acetal may preferably be dimethoxymethane, 1,1-dimethoxyethane, 1,1-dimethoxypropane, diethoxyethane, 1,1-diethoxyethane, 1,1-diethoxypropane, etc.

As the hemiacetal, any one of a compound derived from a ketone compound and a compound derived from an aldehyde compound is preferred, but a compound derived from an aldehyde is more preferred, since the dehydration effect tends to be thereby high. Specific examples of the hemiacetal may preferably be 1-methoxy-1-ethanol, 1-methoxy-1-propanol, 1-methoxy-1-butanol, 1-ethoxy-1-ethanol, 1-ethoxy-1-propanol, 1-ethoxy-1-butanol, etc.

Among these dehydration agents, trimethyl orthoformate, triethyl orthoformate, dimethoxymethane, 1,1-dimethoxyethane and 1-methoxy-1-ethanol are more preferred, since they are readily available.

The amount of the dehydration agent to be added is preferably within a range of from 0.5 to 30.0 parts by mass, more preferably within a range of from 1.0 to 20.0 parts by mass, further preferably within a range of from 2.0 to 10.0 parts by mass, per 100 parts by mass of the hydrolyzable silyl group-containing fluoropolymer (B) obtained by the process of the present invention.

When the amount of the dehydration agent is at least 0.5 part by mass, it is possible to improve the storage stability and pot life of the hydrolyzable silyl group-containing fluoropolymer (B) by a sufficient dehydration effect. Further, when it is at most 30.0 parts by mass, curing at the time of coating is less likely to be impaired, and curing failure of a coating film is less likely to occur.

One of the dehydration agents, may be used alone, or two or more of them may be used in combination.

The hydrolyzable silyl group-containing fluoropolymer (B) obtained by the process of the present invention can be used as a fluororesin for a fluororesin coating material having a high weather resistance. For example, a coating additive may be incorporated to a varnish containing the above hydrolyzable silyl group-containing fluoropolymer (B) to obtain a coating material. It is preferred that the above-mentioned dehydration agent is incorporated to such a varnish. Here, the coating additive is meant for a curing agent, a curing catalyst, a pigment, other resins, a ultraviolet absorber, a leveling agent, a defoaming agent, etc.

As the curing agent, an isocyanate type curing agent or a silane type curing agent may suitably be used.

In the isocyanate type curing agent, a blocked isocyanate type curing agent is also included, and specifically, 2,4-tolylene diisocyanate, diphenylmethane-4,4-diisocyanate, xylylene diisocyanate, isophorone diisocyanate, lysinemethylester diisocyanate, methylcyclohexyl diisocyanate, trimethylhexamethylene diisocyanate, hexamethylene diisocyanate, a trimer thereof, an adduct thereof, or a burette form thereof may, for example, be preferred.

As the silane type curing agent, a tetra-functional alkoxysilane such as tetramethoxysilane, tetraethoxysilane or tetraisopropoxysilane, or a partially hydrolyzed condensate thereof; a trifunctional alkoxysilane such as methyltrimethoxysilane, methyltriethoxysilane, phenyltrimethoxysilane, phenyltriethoxysilane, hexyltrimethoxysilane, hexyltriethoxysilane, decyltrimethoxysilane or trifluoropropyltrimethoxysilane, or a partially hydrolyzed condensate thereof; or a bifunctional alkoxysilane such as dimethyldimethoxysilane, diphenyldimethoxysilane, dimethyldiethoxysilane or diphenyldiethoxysilane, or a partially hydrolyzed condensate thereof may, for example, be preferred.

The amount of the curing agent to be added is preferably from 3.0 to 70.0 wt %, more preferably from 5.0 to 50.0 wt %, based on the hydrolyzable silyl group-containing fluoropolymer.

As the curing catalyst, an acidic phosphoric acid ester such as a phosphoric acid monoester or a phosphoric acid diester; an acidic boric acid ester such as a boric acid monoester or a boric acid diester; an amine-addition product such as an addition reaction product of an acidic phosphoric acid ester with an amine or an addition reaction product of a carboxylic acid compound with an amine; a metal ester such as tin octylate or dibutyltin dilaurate; a metal chelate such as aluminum tris (acetylacetonate) or zirconium tetrakis(acetylacetonate); or a metal alkoxide such as aluminum isopropoxide or titanium butoxide, may, for example, be preferred.

The amount of the curing catalyst to be added is preferably from 0.01 to 10.0 wt %, more preferably from 0.05 to 5.0 wt %, based on the hydrolyzable silyl group-containing fluoropolymer.

The pigment may, for example, be an inorganic pigment such as carbon black or titanium oxide, or an organic pigment such as phthalocyanine blue, phthalocyanine green, quinacridone red, indanthrene orange or indolinone type yellow. The titanium oxide is preferably surface-covered titanium oxide, and such titanium oxide is available, for example, as tradename "PFC-105" manufactured by Ishihara Sangyo Kaisha, Ltd. or tradename "D-918" manufactured by Sakai Chemical Industry Co., Ltd.

The amount of the pigment to be added is preferably from 10.0 to 80.0 wt %, more preferably from 20.0 to 70.0 wt %, based on the hydrolyzable silyl group-containing fluoropolymer.

Other resins may, for example, be a non-fluorinated resin such as an acryl resin, a polyester resin, an acrylpolyol resin, a polyesterpolyol resin, a urethane resin, an acrylsilicone resin, a silicone resin, an alkyd resin, an epoxy resin, an oxetane resin or an amino resin, and a fluororesin other than the fluoropolymer (A). Other resins may have a reaction curable moiety.

The amount of other resins to be added is preferably from 3.0 to 70.0 wt %, more preferably from 5.0 to 50.0 wt %, based on the hydrolyzable silyl group-containing fluoropolymer.

The ultraviolet absorber may, for example, be preferably a benzophenone type compound, a benzotriazole type compound, a triazine type compound or a cyanoacrylate type compound. Such a compound is available, for example, as "VIOSORB 130", "VIOSORB 582", or "VIOSORB 583" (tradename, manufactured by Kyodo Chemical Co., Ltd.), or "TINUVIN 320", "TINUVIN 982", "TINUVIN 1130" or "TINUVIN 400" (tradename, manufactured by Ciba Specialty Chemicals).

The amount of the ultraviolet absorber to be added is preferably from 0.01 to 10.0 wt %, more preferably from 0.05 to 5.0 wt %, based on the hydrolyzable silyl group-containing fluoropolymer.

The leveling agent is available, for example, as "POLYFLOW No. 7", "POLYFLOW No. 50E", "POLYFLOW No. 55", "POLYFLOW No. 75", "POLYFLOW No. 77", "POLYFLOW No. 85", "POLYFLOW No. S" or "POLYFLOW No. 90", tradename, manufactured by Kyoeisha Chemical Co., Ltd., as "DISPARLON L-1980-50", "DISPARLON L-1982-50", "DISPARLON L-1983-50", "DISPARLON L-1984-50" or "DISPARLON L-1985-50", tradename, manufactured by Kusumoto Chemicals Ltd., as "SURFYNOL 104", "SURFYNOL 420", "SURFYNOL 440" or "SURFYNOL 465", tradename, manufactured by Air Products Japan, or as "BYK-300" or "BYK-320", tradename, manufactured by BYK-Chemie.

The amount of the leveling agent to be added is preferably from 0.01 to 10.0 wt %, more preferably from 0.05 to 5.0 wt %, based on the hydrolyzable silyl group-containing fluoropolymer.

The defoaming agent is available, for example, as "FLOWLEN AC-300HF", FLOWLEN AC-326F", FLOWLEN AC-901 HF", FLOWLEN AC-903HF" or FLOWLEN AC-1190HF", tradename, manufactured by Kyoeisha Chemical Co., Ltd., or as "DISPARLON LAP-10", "DISPARLON LAP-20" or "DISPARLON LAP-30", tradename, manufactured by Kusumoto Chemicals Ltd.

The amount of the defoaming agent to be added is preferably from 0.01 to 10.0 wt %, more preferably from 0.05 to 5.0 wt %, based on the hydrolyzable silyl group-containing fluoropolymer.

The fluororesin coating material containing the hydrolyzable silyl group-containing fluoropolymer obtained by the process of the present invention may be applied to various substrates. The substrates to be coated are not particularly limited and may, for example, be inorganic materials such as concrete, natural stones, glass, etc.; metals such as iron, stainless steel, aluminum, copper, brass, titanium, etc.; or organic materials such as plastics, rubber, bonding materials, woods, etc. Further, an organic/inorganic composite material such as FRP, resin-reinforced concrete or fiber-reinforced concrete may also be mentioned.

The fluororesin coating material containing the hydrolyzable silyl group-containing fluoropolymer obtained by the process of the present invention may be used for transportation equipments such as automobiles, electric trains, aircrafts, etc.; civil engineering materials such as bridge components, steel towers, etc.; industrial materials such as waterproof sheets, tanks, pipes, etc; building materials such as building exterior equipments, doors, window materials, monuments, poles, etc.; road construction members such as road center dividers, guardrails, sound insulating walls, polycarbonate or acrylic translucent plates, etc.; communication equipments;

electric and electronic members; or as a coating material for wind-power generation, a coating material for solar cell back sheets, a coating material for protecting solar cell surfaces, or a coating liquid for solar thermal power generation mirrors.

EXAMPLES

Now, the present invention will be described with reference to Examples, but it should be understood that the present invention is by no means limited to these Examples.

Production Example 1

Production of Mineral Spirit Solution of Hydroxy Group-Containing Fluoropolymer (A)

Into a 1 L eggplant-form flask, LUMIFLON LF800Y (xylene solution of hydroxy group-containing fluoropolymer (A), nonvolatile content: 60%, hydroxy value: 36 mgKOH/g, manufactured by Asahi Glass Company, Limited) (600 g) and mineral spirit (210 g) were added, and solvent substitution by mineral spirit was carried out by evaporation to obtain a mineral spirit solution of the hydroxy group-containing fluoropolymer (A) (nonvolatile content: 73.5%).

Example 1

Into a four-necked flask having a capacity of 500 ml and equipped with a thermometer, a reflux condenser and a stirrer, the mineral spirit solution of the hydroxy group-containing fluoropolymer (A) obtained in Production Example 1 (326.5 g), 3-isocyanate propyl trimethoxysilane (38.1 g) and tin 2-ethylhexanoate (0.05 g) were added, and a reaction was carried out at 50° C. for 5 hours in a nitrogen atmosphere.

The infrared absorption spectrum of the obtained solution was measured, whereby no absorption peak was observed at the absorption band attributable to an isocyanate group, and instead, a large absorption peak was observed at the absorption band attributable to a urethane bond, and thus formation of a fluoropolymer containing hydrolyzable silyl groups was confirmed.

After the reaction, trimethyl orthoformate (13.6 g) and isopropanol (13.6 g) were added to obtain a composition containing the fluoropolymer (B) (nonvolatile content: 70.0%).

The reacted 3-isocyanate propyltriethoxysilane (compound (1)) was 1 time by mole, per mole of the hydroxy group of the hydroxy group-containing fluoropolymer (A), and the amount of the compound (2) added was 61.3 ppm by mass of tin metal single substance based on the hydroxy group-containing fluoropolymer (A).

Example 2

A composition containing a fluoropolymer (B) (nonvolatile content: 70.0%) was obtained in the same manner as in Example 1 except that in Example 1, 3-isocyanate propyltriethoxysilane (38.1 g) was changed to (45.7 g), and further, tin 2-ethylhexanoate (0.05 g) was changed to (0.1 g).

The reacted 3-isocyanate propyltriethoxysilane (compound (1)) was 1.2 times by mole, per mole of the hydroxy group of the hydroxy group-containing fluoropolymer (A), and the amount of the compound (2) added was 122.0 ppm by mass of tin metal single substance based on the hydroxy group-containing fluoropolymer (A).

Example 3

A composition containing a fluoropolymer (B) (nonvolatile content: 70.0%) was obtained in the same manner as in Example 1 except that in Example 1, 3-isocyanate propyltriethoxysilane (38.1 g) was changed to (34.3 g).

The reacted 3-isocyanate propyltriethoxysilane (compound (1)) was 0.9 time by mole, per mole of the hydroxy group of the hydroxy group-containing fluoropolymer (A), and the amount of the compound (2) added was 61.3 ppm by mass of tin metal single substance based on the hydroxy group-containing fluoropolymer (A).

Example 4

A composition containing a fluoropolymer (B) (nonvolatile content: 70.0%) was obtained in the same manner as in Example 1 except that in Example 1, tin 2-ethylhexanoate (0.05 g) was changed to zinc 2-ethylhexanoate (0.1 g).

The reacted 3-isocyanate propyltriethoxysilane (compound (1)) was 1.0 time by mole, per mole of the hydroxy group of the hydroxy group-containing fluoropolymer (A), and the amount of the compound (2) added was 77.4 ppm by mass of zinc metal single substance based on the hydroxy group-containing fluoropolymer (A).

Example 5

A composition containing a fluoropolymer (B) (nonvolatile content: 70.0%) was obtained in the same manner as in Example 1 except that in Example 1, tin 2-ethylhexanoate (0.05 g) was changed to zirconium 2-ethylhexanoate (0.2 g).

The reacted 3-isocyanate propyltriethoxysilane (compound (1)) was 1.0 time by mole, per mole of the hydroxy group of the hydroxy group-containing fluoropolymer (A), and the amount of the compound (2) added was 102.1 ppm by mass of zirconium metal single substance based on the hydroxy group-containing fluoropolymer (A).

Example 6

A composition containing a fluoropolymer (B) (nonvolatile content: 70.0%) was obtained in the same manner as in Example 1 except that in Example 1, tin 2-ethylhexanoate (0.05 g) was changed to aluminum triacetylacetate (0.3 g).

The reacted 3-isocyanate propyltriethoxysilane (compound (1)) was 1.0 time by mole, per mole of the hydroxy group of the hydroxy group-containing fluoropolymer (A), and the amount of the compound (2) added was 104.1 ppm by mass of aluminum metal single substance based on the hydroxy group-containing fluoropolymer (A).

Example 7

Into a stainless steel autoclave having an internal capacity of 300 ml and equipped with a stirrer, 3-ethyl-3-vinyloxymethyloxetane (33.5 g), hydroxyethyl vinyl ether (17.3 g), xylene (100.0 g), ethanol (17.7 g) and potassium carbonate (1.0 g) were introduced all at once, and dissolved oxygen was removed by nitrogen.

Then, chlorotrifluoroethylene (45.8 g) was introduced into the autoclave, and the temperature was gradually raised and when it reached 55° C., a xylene solution (0.6 g) containing 50% of t-butylperoxypivalate was introduced into the autoclave over a period of 2 hours, followed by stirring for further 15 hours, and then, the reaction was terminated. After the reaction, potassium carbonate was removed by filtration, and further, ethanol was distilled off by evaporation to obtain a xylene solution of a hydroxy group-containing fluoropolymer (A) (nonvolatile content: 50.0%).

Then, this xylene solution (193.2 g) of the hydroxy group-containing fluoropolymer (A) was transferred to a four-necked flask having a capacity of 500 ml and equipped with a thermometer, a reflux condenser and a stirrer, and 3-isocyanate propyltriethoxysilane (compound (1)) (47.4 g) and tin 2-ethylhexanoate (compound (2)) (0.02 g) were added, and a reaction was conducted at 50° C. for 5 hours in a nitrogen atmosphere. Then, xylene was distilled off by evaporation to obtain a xylene solution of a fluoropolymer (B) (nonvolatile content: 73.5%).

The infrared absorption spectrum of the obtained solution was measured, whereby no absorption peak was observed at the absorption band attributable to an isocyanate group, and instead, a large absorption peak was observed at the absorption band attributable to a urethane bond, and thus, formation of the fluoropolymer (B) containing hydrolyzable silyl groups was confirmed.

After the reaction, trimethyl orthoformate (4.3 g) and isopropanol (4.3 g) were added to obtain a composition containing fluoropolymer (B) (nonvolatile content: 70.0%).

The reacted 3-isocyanate propyl triethoxysilane (compound (1)) was 1.0 time by mole, per mole of the hydroxy group of the hydroxy group-containing fluoropolymer (A), and the amount of the compound (2) added was 61.3 ppm by mass of tin metal single substance based on the hydroxy group-containing fluoropolymer (A).

Comparative Example 1

A composition containing a fluoropolymer (B) was obtained in the same manner as in Example 1 except that in Example 1, tin 2-ethylhexanoate (0.05 g) was changed to (0.025 g).

The reacted 3-isocyanate propyltriethoxysilane (compound (1)) was 1.0 time by mole, per mole of the hydroxy group of the hydroxy group-containing fluoropolymer (A), and the amount of the compound (2) added was 30.5 ppm by mass of tin metal single substance based on the hydroxy group-containing fluoropolymer (A).

Comparative Example 2

A composition containing a fluoropolymer (B) was obtained in the same manner as in Example 1 except that in Example 1, tin 2-ethylhexanoate (0.05 g) was changed to (0.3 g).

The reacted 3-isocyanate propyltriethoxysilane (compound (1)) was 1.0 time by mole, per mole of the hydroxy group of the hydroxy group-containing fluoropolymer (A), and the amount of the compound (2) added was 367.0 ppm by mass of tin metal single substance based on the hydroxy group-containing fluoropolymer (A).

Comparative Example 3

Into a four-necked flask having a capacity of 300 ml and equipped with a thermometer, a reflux condenser and a stirrer, LUMIFLON LF200 (xylene solution of hydroxy group-containing fluoropolymer (A), nonvolatile content: 60%, hydroxy value: 52 mgKOH/g, manufactured by Asahi Glass Company, Limited) (100 g), 3-isocyanate propyltriethoxysilane (11.3 g), and a xylene solution (0.1 g) containing 10% of dibutyltin dilaurate, were added, and a reaction was carried out at 80° C. for 6 hours in a nitrogen atmosphere. Then, xylene was distilled off by evaporation to obtain a xylene solution of a fluoropolymer (B) (nonvolatile content: 73.5%).

The infrared absorption spectrum of the obtained solution was measured, whereby a large absorption peak was observed at an absorption band attributable to a urethane bond, but an absorption peak was also observed at the absorption band attributable to an isocyanate group, and thus, it was confirmed that the reaction was not completed.

After the reaction, trimethyl orthoformate (3.6 g) and isopropanol (3.6 g) were added to obtain a composition containing the fluoropolymer (B) (nonvolatile content: 70.0%).

The reacted 3-isocyanate propyltriethoxysilane (compound (1)) was 1.0 time by mole, per mole of the hydroxy group of the hydroxy group-containing fluoropolymer (A), and the amount of the compound (2) added was 31.4 ppm by mass of tin metal single substance based on the hydroxy group-containing fluoropolymer (A).

Comparative Example 4

A composition containing a fluoropolymer (B) (nonvolatile content: 70.0%) was obtained in the same manner as in Example 1 except that in Example 1, tin 2-ethylhexanoate (0.05 g) was changed to (0.2 g).

The reacted 3-isocyanate propyltriethoxysilane (compound (1)) was 1.0 time by mole, per mole of the hydroxy group of the hydroxy group-containing fluoropolymer (A), and the amount of the compound (2) added was 245.0 ppm by mass of tin metal single substance based on the hydroxy group-containing fluoropolymer (A).

Comparative Example 5

A composition containing a fluoropolymer (B) (nonvolatile content: 70.0%) was obtained in the same manner as in Example 1 except that in Example 1, tin 2-ethylhexanoate (0.05 g) was changed to (0.15 g).

The reacted 3-isocyanate propyltriethoxysilane (compound (1)) was 1.0 time by mole, per mole of the hydroxy group of the hydroxy group-containing fluoropolymer (A), and the amount of the compound (2) added was 183.0 ppm by mass of tin metal single substance based on the hydroxy group-containing fluoropolymer (A).

With respect to the composition containing the fluoropolymer (B) obtained in each of Examples 1 to 7 and Comparative Examples 1 to 5, evaluation was carried out by the following storage stabilization tests.

[Storage Stability 1]

The composition containing the fluoropolymer (B) obtained in each of Examples 1 to 7 and Comparative Example 1 to 5 was stored for 9 months in a sealed container under such conditions that the humidity was 50% and the temperature was 50° C., whereupon the viscosity was measured by an E type viscometer. The viscosity rising ratio to the initial viscosity was calculated, and evaluation was carried out by the following standards.

⊚: Viscosity rising ratio being less than 1.1
○: Viscosity rising ratio being at least 1.1 and less than 1.5
Δ: Viscosity rising ratio being at least 1.5
X: Measurement of viscosity being impossible since the fluorinated polymer composition underwent gelation

[Storage Stability 2]

The composition containing the fluoropolymer (B) obtained in each of Examples 1 to 7 and Comparative Example 1 to 5 was stored for 12 months in a sealed container under such conditions that the humidity was 50% and the temperature was 50° C., whereupon the viscosity was measured by an E type viscometer. The viscosity rising ratio to the initial viscosity was calculated, and evaluation was carried out by the following standards.

⊚: Viscosity rising ratio being less than 1.1
◯: Viscosity rising ratio being at least 1.1 and less than 1.5
Δ: Viscosity rising ratio being at least 1.5
X: Measurement of viscosity being impossible since the fluorinated polymer composition underwent gelation

TABLE 1

| Examples | Compound (2) | Metal concentration (ppm) | Molar ratio* (times by mole) | Storage stability 1 | Storage stability 2 |
|---|---|---|---|---|---|
| Ex. 1 | Tin 2-ethylhexanoate | 61.3 | 1.0 | ⊚ | ⊚ |
| Ex. 2 | Tin 2-ethylhexanoate | 122.0 | 1.2 | ⊚ | ◯ |
| Ex. 3 | Tin 2-ethylhexanoate | 61.3 | 0.9 | ⊚ | ⊚ |
| Ex. 4 | Zinc 2-ethylhexanoate | 77.4 | 1.0 | ⊚ | ◯ |
| Ex. 5 | Zirconium 2-ethylhexanoate | 102.1 | 1.0 | ⊚ | ◯ |
| Ex. 6 | Aluminum tris-acetylacetonate | 104.1 | 1.0 | ⊚ | ◯ |
| Ex. 7 | Tin 2-ethylhexanoate | 61.3 | 1.0 | ⊚ | ⊚ |
| Comp. Ex. 1 | Tin 2-ethylhexanoate | 30.5 | 1.0 | Δ | X |
| Comp. Ex. 2 | Tin 2-ethylhexanoate | 367.0 | 1.0 | X | X |
| Comp. Ex. 3 | Dibutyltin dilaurate | 31.4 | 1.0 | Δ | X |
| Comp. Ex. 4 | Tin 2-ethylhexanoate | 245.0 | 1.0 | ⊚ | Δ |
| Comp. Ex. 5 | Tin 2-ethylhexanoate | 183.0 | 1.0 | ⊚ | Δ |

*The molar ratio represents the amount of the compound (1) reacted per mole of the hydroxy group of the hydroxy group-containing fluoropolymer (A).

INDUSTRIAL APPLICABILITY

The present invention provides a process for producing a hydrolyzable silyl group-containing fluoropolymer which is excellent in storage stability and has a sufficient pot life.

What is claimed is:

1. A process for producing a hydrolyzable silyl group-containing fluoropolymer (B), which comprises reacting a hydroxy group-containing fluoropolymer (A) and a compound (1) represented by the following formula (1) in the presence of a reaction solvent and a compound (2) represented by the following formula (2) under such a condition that the amount of the compound (2) is from 45 to 122 ppm by mass of metal in the compound (2) based on the hydroxy group-containing polymer (A), to obtain a fluoropolymer (B) having a group represented by the following formula (3):

OCN(CH$_2$)$_m$SiX$^1_n$R$^1_{3-n}$ (1)

wherein in the formula (1), R$^1$ is a hydrogen atom or a C$_{1-10}$ monovalent hydrocarbon group, X$^1$ is a C$_{1-5}$ alkoxy group, n is an integer of from 1 to 3, and m is an integer of from 1 to 5, —OC(O)NH(CH$_2$)$_m$SiX$^1_n$R$^1_{3-n}$ (3)

wherein in the formula (3), R$^1$, X$^1$, n and m are as defined above, wherein said compound (2) is at least one compound selected from the group consisting of tin 2-ethylhexanoate, zinc 2-ethylhexanoate, zirconium 2-ethylhexanoate and aluminum tris-acetylacetonate.

2. The process for producing a hydrolyzable silyl group-containing fluoropolymer according to claim 1, wherein the compound (1) represented by the formula (1) is reacted in an amount of from 0.8 to 1.5 times by mol per mol of the hydroxy group in the hydroxy group-containing fluoropolymer (A).

3. The process for producing a hydrolyzable silyl group-containing fluoropolymer according to claim 1, wherein the hydroxy group-containing fluoropolymer (A) is a polymer that comprises repeating units (A1) based on a fluoroolefin and repeating units (A2) based on a hydroxy group-containing monomer and that further contains at least one type of repeating units selected from repeating units (A3) based on a monomer which has an alkyl group and a polymerizable unsaturated group connected by an ether bond or an ester bond, and repeating units (A4) based on an oxetanyl group-containing monomer which may have a substituent.

4. The process for producing a hydrolyzable silyl group-containing fluoropolymer according to claim 1, wherein the reaction solvent is a weak solvent.

5. A process for producing a composition comprising a weak solvent and a hydrolyzable silyl group-containing fluoropolymer, which comprises producing a composition comprising a reaction solvent and the hydrolyzable silyl group-containing fluoropolymer (B) by the process as defined in claim 1 by using the reaction solvent other than the weak solvent, and then carrying out solvent substitution of the weak solvent for the reaction solvent.

6. The process for producing a composition according to claim 5, wherein the composition comprising the weak solvent further contains the compound (2) used for the reaction to produce the hydrolyzable silyl group-containing fluoropolymer (B).

7. A process for producing a dehydration agent-containing composition, which comprises adding, to a composition comprising a weak solvent and the hydrolyzable silyl group-containing fluoropolymer (B) produced by the process according to claim 5, at least one dehydration agent selected from the group consisting of ortho acid esters, acetals and hemiacetals, in an amount of from 0.1 to 10.0 parts by mass per 100 parts by mass of the fluoropolymer (B).

8. A process for producing a dehydration agent-containing composition, which comprises adding, to a composition comprising the hydrolyzable silyl group-containing fluoropolymer (B) produced by the process according to claim 1, and the reaction solvent used in the process, at least one dehydration agent selected from the group consisting of ortho acid esters, acetals and hemiacetals, in an amount of from 0.1 to 10.0 parts by mass per 100 parts by mass of the fluoropolymer (B).

9. The process for producing a hydrolyzable silyl group-containing fluoropolymer according to claim 1, wherein the amount of the compound (2) is from 45 to 110 ppm by mass of metal in the compound (2) based on the hydroxy group-containing polymer (A).

10. The process for producing a hydrolyzable silyl group-containing fluoropolymer according to claim 1, wherein the amount of the compound (2) is from 50 to 90 ppm by mass of metal in the compound (2) based on the hydroxy group-containing polymer (A).

11. The process for producing a hydrolyzable silyl group-containing fluoropolymer according to claim 1, wherein the amount of the compound (2) is from 60 to 80 ppm by mass of metal in the compound (2) based on the hydroxy group-containing polymer (A).

12. The process for producing a hydrolyzable silyl group-containing fluoropolymer according to claim 1, wherein compound (2) is tin 2-ethylhexanoate, zinc 2-ethylhexanoate, or zirconium 2-ethylhexanoate.

* * * * *